(12) United States Patent
Brady, III et al.

(10) Patent No.: US 7,268,607 B2
(45) Date of Patent: Sep. 11, 2007

(54) INTEGRATING CAPACITANCE CIRCUITRY FOR AN INTEGRATING AMPLIFIER AND RELATED METHOD

(75) Inventors: John F. Brady, III, Richardson, TX (US); Stephen D. Gaalema, Colorado Springs, CO (US)

(73) Assignee: L-3 Communications Corporation, New York, NY (US)

( * ) Notice: Subject to any disclaimer, the term of this patent is extended or adjusted under 35 U.S.C. 154(b) by 27 days.

(21) Appl. No.: 11/140,846

(22) Filed: May 31, 2005

(65) Prior Publication Data

US 2006/0125544 A1  Jun. 15, 2006

Related U.S. Application Data

(60) Provisional application No. 60/635,272, filed on Dec. 10, 2004.

(51) Int. Cl.
*G06G 7/18* (2006.01)
(52) U.S. Cl. .................................. 327/337; 327/554
(58) Field of Classification Search ............... 327/336, 327/337, 554; 330/9; 324/519, 522
See application file for complete search history.

(56) References Cited

U.S. PATENT DOCUMENTS

| | | | |
|---|---|---|---|
| 4,404,525 A * | 9/1983 | Amir et al. .................. 330/9 |
| 5,128,534 A | 7/1992 | Wyles ...................... 250/208.1 |
| 6,040,568 A * | 3/2000 | Caulfield et al. ........ 250/208.1 |
| 6,147,340 A | 11/2000 | Levy ....................... 250/214 R |
| 6,384,413 B1 | 5/2002 | Pain ........................... 250/330 |
| 6,849,845 B2 | 2/2005 | Lauffenberger et al. .................... 250/214 SW |
| 6,873,359 B1 * | 3/2005 | Kozlowski et al. ......... 348/241 |
| 7,015,742 B2 * | 3/2006 | Ke .............................. 327/337 |
| 7,148,727 B2 | 12/2006 | Van Bogget ................. 327/77 |
| 2003/0224740 A1 * | 12/2003 | Takano et al. .............. 455/102 |

* cited by examiner

*Primary Examiner*—Kenneth B. Wells
*Assistant Examiner*—Ryan Jager
(74) *Attorney, Agent, or Firm*—O'Keefe, Egan, Peterman & Enders, LLP

(57) ABSTRACT

An integrating capacitor circuit for an integrating amplifier and related methods are disclosed that allow for efficient detection of currents or charges, particularly those produced by pixel cells in a detector image array. By placing a capacitor-connected field-effect-transistor (FET) in parallel with an integration capacitor and setting its gate voltage to a selected voltage level, the current or charge from the detector depletes the charge on the gate of the FET capacitor while integrating on the capacitor. In addition, the gate voltage level can be adjusted to modify the current depleting characteristics of the capacitor-connected FET. The resulting operation of this integrating circuitry provides significant resulting advantages for the integrating amplifier.

22 Claims, 3 Drawing Sheets

US 7,268,607 B2

INTEGRATING CAPACITANCE CIRCUITRY FOR AN INTEGRATING AMPLIFIER AND RELATED METHOD

RELATED APPLICATIONS

This application claims priority to the following co-pending provisional application: Provisional Application Ser. No. 60/635,272 filed Dec. 10, 2004, and entitled "NON-LINEAR INTEGRATING AMPLIFIER," which is hereby expressly incorporated by reference in its entirety.

GOVERNMENT RIGHTS

This invention was made with United States Government support under Contract No. DAAB07-98-3-J002. The Government may have certain rights in this invention.

TECHNICAL FIELD OF THE INVENTION

This invention relates to techniques and architectures for measuring electrical currents or charge, and more particularly, for integrating signals obtained from pixel cells in image sensing systems.

BACKGROUND

Many devices utilize current and/or charge measurements for operations. One such set of devices are digital cameras that utilize detector arrays to acquire scene energy. These detector arrays typically include detector cells that absorb scene energy. The voltages on these cells can then be measured, quantified and processed in order to produce a digital image of the scene being viewed. As part of this process, a detection current is often measured with respect to each pixel cell within an image sensing system.

One method of measuring a current is to integrate that current on a capacitor for a fixed amount of time and then measure the voltage on the capacitor. Because the voltage is inversely proportional to the capacitance, a small capacitance will give the circuit higher sensitivity (i.e., a large change in voltage for a small change in current). Unfortunately, small capacitors have more limited integration times and, therefore, cause reduced signal to noise ratios. In other words, the longer the integration time is for the integration node, the better the signal to noise ratio tends to be. At long integration times, however, the voltage on the capacitor also gets large, and larger capacitors tend to degrade sensitivity. Thus, although larger integration capacitors can increase the integration time, they also have the downside of lowering sensitivity. And although higher integration voltages increase integration times, these higher voltages also cause problems for current integrated circuits where the maximum voltages are limited to avoid damage to the integrated devices. Other attempts to improve integration have included subtracting a fixed current from the integration node. This technique, however, can increase noise and/or become very complicated to achieve.

SUMMARY OF THE INVENTION

The present invention provides an integrating capacitor circuit for an integrating amplifier and related method that allows for efficient measurement of currents and, more particularly, currents from pixel cells within an image detector array. By placing a capacitor-connected field-effect-transistor (FET) in parallel with an integration capacitor and setting its gate voltage to a voltage level, the current from the detector depletes the charge on the gate of the FET capacitor while integrating on the capacitor. In addition, the gate voltage level can be adjusted to modify the current depleting characteristics of the capacitor-connected FET. The resulting operation of this integrating circuitry, including the non-linear operation of the capacitor-connected FET, provides significant resulting advantages for the integrating amplifier. As described below, other features and variations can be implemented, if desired.

In one embodiment, the present invention is an integrating amplifier including an integrating capacitance circuit including a detector element coupled to an integration node, an integrating capacitance circuit, and an amplifier coupled to the integration node to provide an amplified output signal that is related to the signal from the detector element, where the integrating circuit includes an integrating capacitor coupled between the integration node and a reference node with the integration node being an integration node coupled to receive a signal to be integrated and a field effect transistor (FET) coupled between the integration node and a voltage node having a voltage level with the FET having its source and drain coupled to the integration node or the voltage node and having its gate coupled to the other of the integration node or the voltage node to thereby provide a capacitor-connected FET device coupled to the integration node. As described below, other features and variations can be implemented, if desired, and related methods can be utilized, as well.

In another embodiment, the present invention is an integrating capacitance circuit including an integrating capacitor coupled between an integration node and a reference node with the integration node being an integrating node coupled to receive a signal to be integrated and a field effect transistor (FET) coupled between the integration node and a voltage node having a voltage level with the FET having its source and drain coupled to the integration node or the voltage node and having its gate coupled to the other of the integration node or the voltage node to thereby provide a capacitor-connected FET device coupled to the integration node. As described below, other features and variations can be implemented, if desired, and related methods can be utilized, as well.

In a further embodiment, the present invention is a method for integrating signals including applying a signal to be integrated to an integration node, integrating charge on the integration node utilizing over a period of time utilizing an integration capacitor, depleting charge from the integration node during the integration step utilizing a field effect transistor (FET) coupled between the integration node and a voltage node having a voltage level, and utilizing the integrated charge less the depleted charge as an output signal, where the FET has its source and drain coupled to the integration node or the voltage node and has its gate coupled to the other of the integration node or the voltage node to thereby provide a capacitor-connected FET device coupled to the integration node. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an integrating amplifier and related method that allow for efficient measurement of currents, particularly those produced by detector array cells. This advantageous solution to measuring electrical currents is achieved by utilizing a switched-capacitor network with a unique configuration. In particular, a capacitor-connected field-effect-transistor (FET) is utilized to deplete current or charge being integrated on an integrating amplifier. Although usable in other applications, the integrating circuitry of the present invention is particularly useful, for example, in amplifying signals from pixel cells that are part of an image array detector.

Figure 1A:
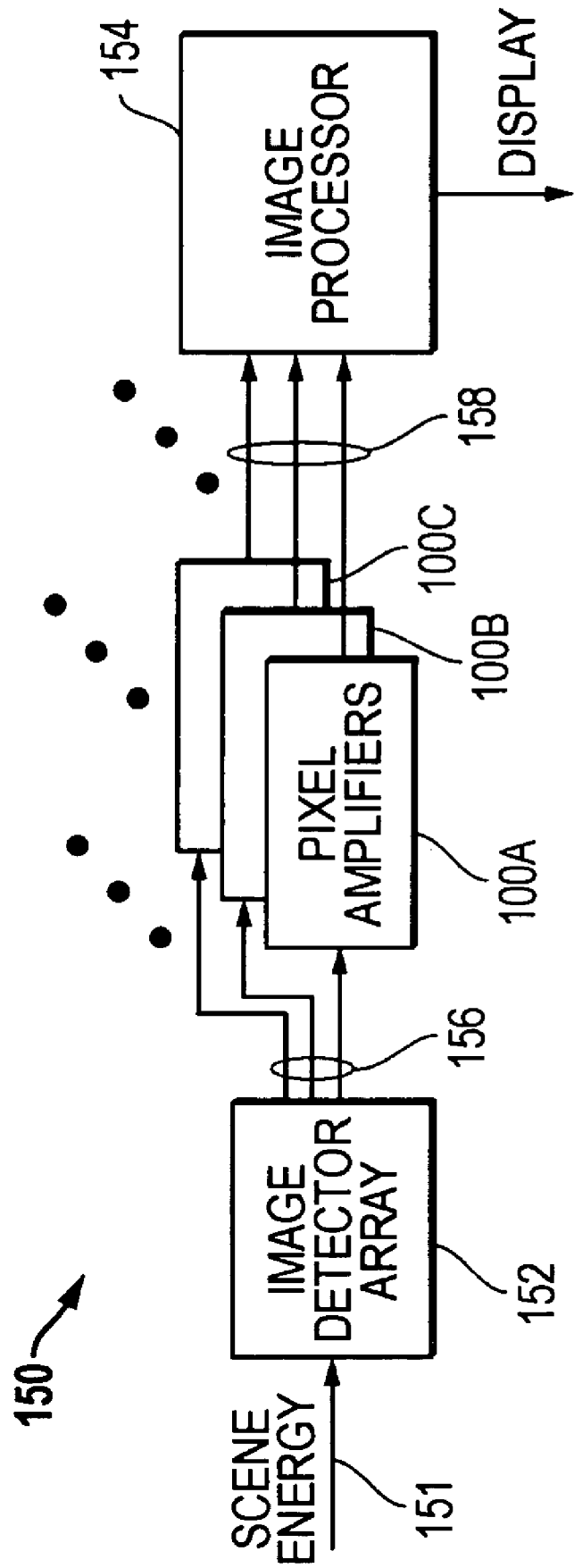
FIG. 1A is a block diagram for an image detector including pixel amplifiers according to the present invention.

FIG. 1A is a block diagram for an image detector including pixel amplifiers 100 according to the present invention. As depicted, scene energy 151 is received by an image detector array 152. Image detector arrays typically include a matrix of detector cells or pixel cells, each of which absorbs or detects energy from the scene. For example, the pixel cells can be configured to provide a current or charge in correlation to the scene energy received by that pixel cell. It is noted that the scene energy 151 is typically focused on the image detector array 152 through a lens system. Such lens systems exist in a wide variety of devices, including infrared lens systems designed for the detection of infrared radiation in a scene. Such lens systems and related cameras are available from a variety of commercial sources, including from the Infrared Products Division of L3 Communications, the assignee of the current application.

As the image scene is being captured, each pixel cell is accessed to determine the level of scene energy it is detecting. Signal lines 156 represent a plurality of signal lines coupled to pixels cells within the image detector array 152. A plurality of pixel amplifiers 100A, 100B, ... 100C ... can be used to provide amplified versions of the scene energy being detected by the pixel cells. For example, a pixel amplifier 100 could be provided for each pixel cell within the image detector array 152. Signal lines 158 then represent the amplified output signals from pixel amplifiers 100A, 100B, 100C ..., and these signal lines 158 provide the amplified values to an image processor 154. The image processor 154 can perform desired processing on the analog pixel cell values, such as analog-to-digital conversion and signal multiplexing followed by storage of the image and further processing of the image. Ultimately, the resulting image can be displayed to a user.

As describe herein, the present invention relates to the integrating circuitry within pixel amplifiers 100 that can be utilized to detect the amount of voltage or charge collected on a pixel cell. It is noted that the integrating circuitry and related pixel amplifier 100 can be utilized in a wide variety of systems where current or charge is integrated, such as, for example, imaging systems where pixel cells need to be read-out for image processing.

Figure 1B:
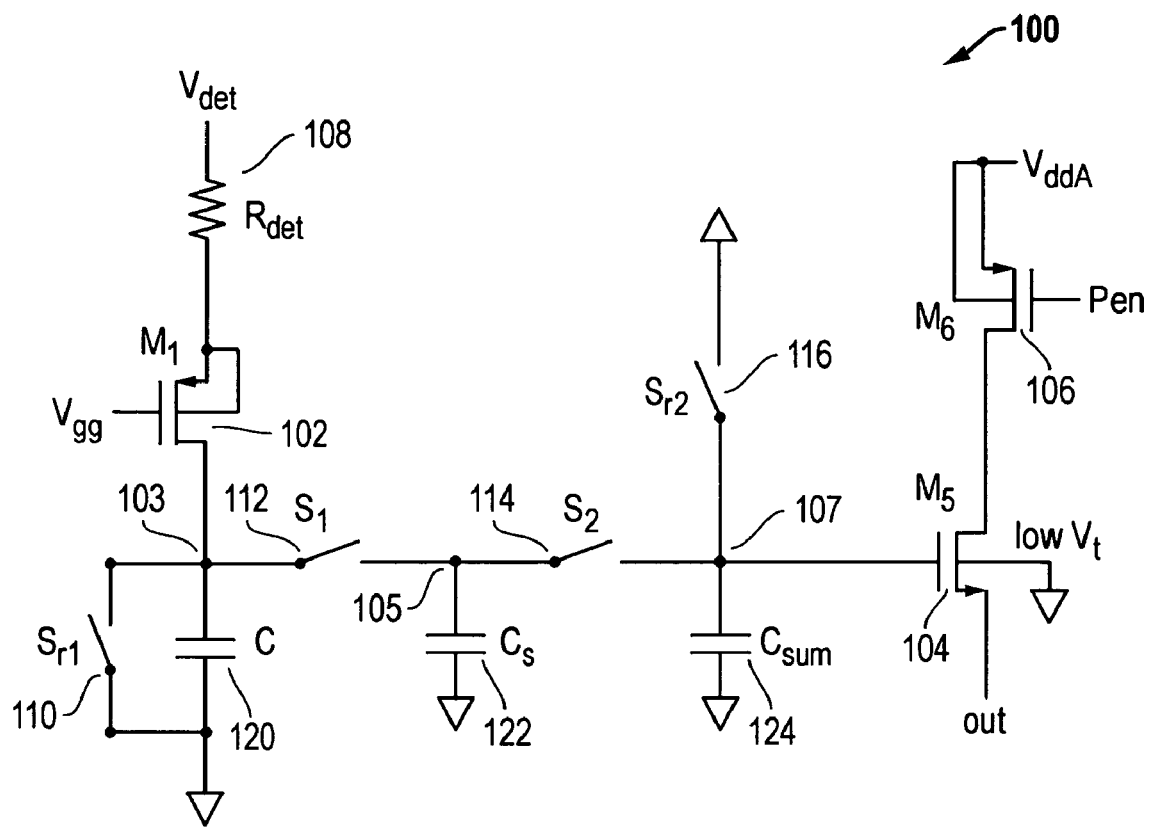
FIG. 1B is a circuit diagram for a non-linear integrating amplifier according to the present invention.

FIG. 1B below shows an example schematic diagram for a read-out integrated circuit (ROIC) unit cell that can be utilized, for example, with pixel cells that are part of an amorphous silicon (a-Si) image detector array. In the embodiment 100 depicted, the detector pixel cell, as represented by resistor (Rdet) 108, is coupled between a reference voltage (Vdet) and the source of transistor (M1) 102. The current generated through the pixel cell (Rdet) 108 relates to the scene energy detected by that pixel cell, as discussed above. The gate of transistor (M1) 102 is connected to a bias voltage Vgg, and the body of transistor (M1) is connected to its source. The drain of transistor (M1) 102 is coupled to integration node 103. Capacitor (C) 120 is coupled between integration node 103 and ground. Also coupled between integration node 103 and ground is switch (Sr1) 110. Integration node 103 is coupled to transfer node 105 through switch (S1) 112. Transfer capacitor (Cs) 122 is coupled between node 105 and ground. Node 105 is coupled to summing node 107 through switch (S2) 114. Summing capacitor (Csum) 124 and switch (Sr2) 116 are coupled between node 107 and ground. Output transistor (M5) 104 has its gate coupled to the summing node 107, its source connected as the output, and its drain connected to the drain of transistor (M6) 106. The body of transistor (M5) 104 is coupled to a low bias voltage (Vt), such as ground. Transistor (M6) 106 has its source and body coupled to a supply voltage (VddA) and its gate coupled to a control signal (Pen). This control signal (Pen) can be used to control when the amplifying output transistor (M5) 104 is "on" or "off." When transistor (M5) 104 is "off," the summed voltage level remains at node 107. When transistor (M5) 104 is "on," it amplifies this summed voltage level and presents it as an amplified output signal (OUT).

Figure 1C:
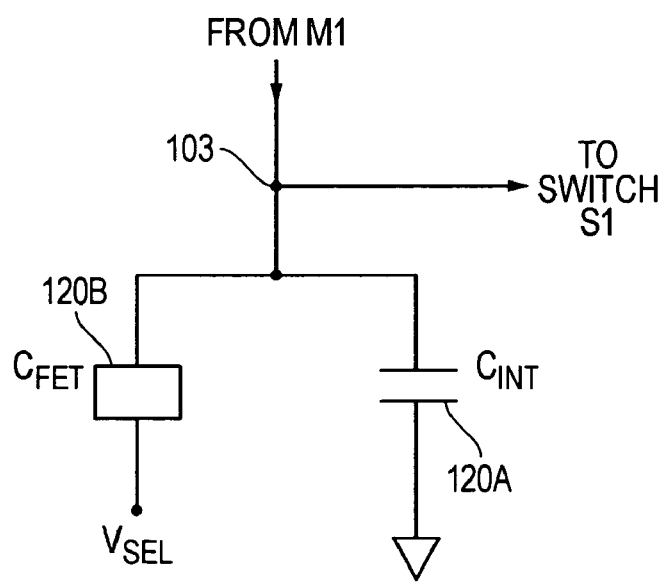
FIG. 1C is a circuitry diagram for an integrating capacitor structure according to the present invention.

As depicted in FIG. 1C, according to the present invention, the capacitor (C) 120 in FIG. 1 is implemented as an integration capacitor ($C_{INT}$) 120A in parallel with a field effect transistor (FET) 120B. As depicted, the integration capacitor ($C_{INT}$) 120A is coupled between the integration node 103 and a reference voltage, such as ground. The FET ($C_{FET}$) 120B is capacitor connected such that its drain and source are connected together to form one plate of a capacitor, and the gate provides the other plate of a capacitor, thereby forming a capacitor-connected device coupled to the integration node 103. For example, the source and drain of the FET ($C_{FET}$) 120B can be coupled to the integration node 103, and the gate of the FET ($C_{FET}$) 120B can be connected to a voltage node having a selected voltage level ($V_{SEL}$). It is also noted that the source and drain of the FET ($C_{FET}$) 120B could be coupled to the voltage node and the gate could be coupled to the integration node 103, if desired.

As discussed below, the voltage level ($V_{SEL}$) on the voltage node determines the amount of charge that is depleted from the integration node 103 by the capacitor-connected FET ($C_{FET}$) 120B. It is noted that the FET ($C_{FET}$) 120B may be a metal-oxide-semiconductor (MOS) device. It is also noted that a variety of other capacitor circuit topologies could also be implemented while still utilizing the depleting capacitor-connected FET ($C_{FET}$) 120B of the present invention. For example, the integration capacitor ($C_{INT}$) 120A could be a plurality of capacitors and/or other devices that are connected so as to form an integrating capacitance for integration node 103. In addition, capacitor-connected FET ($C_{FET}$) 120B could be implemented as one or more FET devices and could include other devices as well as long as the depleting characteristic of the capacitor-connected FET ($C_{FET}$) 120B is maintained.

Example operation of the pixel read-out amplifier 100 of FIG. 1A is as follows. Vdet is set nominally to 5 V, and Vgg is set such that the voltage drop Vbias across the detector 108 is maintained at about 1.0 V. At the beginning of the image frame event, which is the time during which the image sensor array 152 is exposed to the scene energy, switch (Sr2) 116 is closed to reset the summing capacitor (Csum) 124, and then switch (Sr2) 116 is immediately re-opened. Also, switch (Sr1) 110 is closed and re-opened, resetting the integration capacitance (C) 120, which as shown in FIG. 1C can be a combination of an integration capacitor 120A and a charge depleting capacitor-connected FET ($C_{FET}$) 120B. Current integrates onto the integration capacitance (C) 120 for a period ($\tau_{int}$) such that a set of blind reference pixels within the image sensor array 152 reaches a fixed voltage (Vint). Thus, the nominal voltage on the integration capacitor (C) 120 is Vint, and any difference from that value is related to a signal caused by the scene energy, a global offset for the pixel array, or an offset non-uniformity among different pixels within the array. The latter two offset values can be addressed and corrected in signal processing, such as would be conducted by the image processor 154. Next, switch (S1) 112 is closed thereby transferring the charge to a transfer capacitor (Cs) 122, which has a relatively small capacitance value. Then, switch (S1) 112 is again opened. Switch (S2) 114 is then closed, transferring the charge on capacitor (Cs) 122 to a much larger summing capacitor (Csum) 124. Next, switch (S2) 114 is re-opened. This process concludes one micro-integration cycle. After a selected number (N) of such charge transfer cycles, a macro-integration cycle, or a frame, for the image detection system will have been completed. It is noted that the operation of this read-out amplifier, such as the use of blind reference pixels and summing of transferred current or charge of a plurality of cycles to form a image frame, has been implemented in prior systems except for the integrating capacitor structure of the present invention as represented in FIG. 1C, which provides significant operational advantages.

Figure 2:
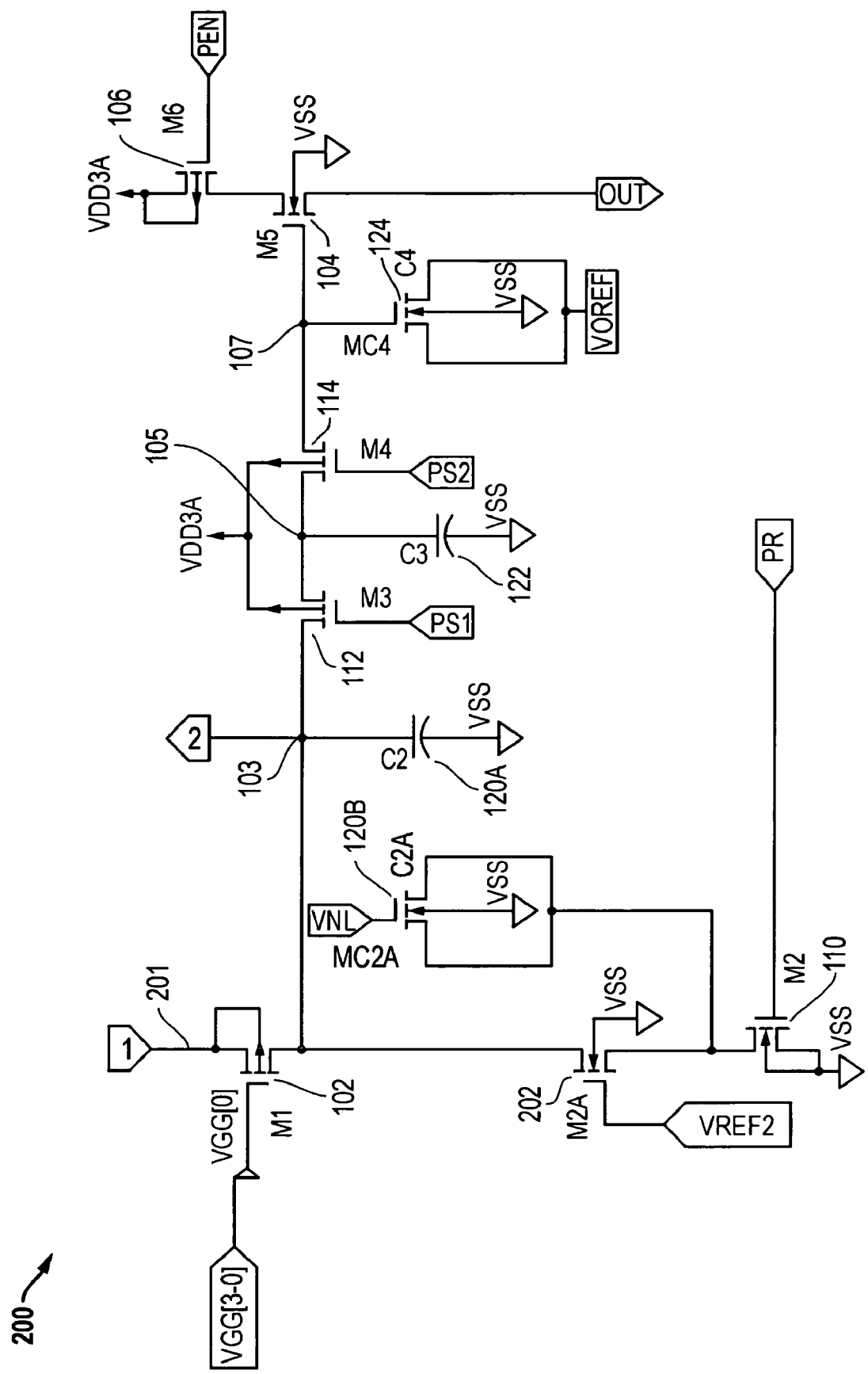
FIG. 2 is a more detailed circuit diagram for a non-linear integrating amplifier according to the present invention.

FIG. 2 is a more detailed circuit diagram for a pixel read-out amplifier 200, according to the present invention, that utilizes the integrating capacitor circuitry of the present invention. For this embodiment, the integrating capacitance (C) 120 is implemented using a capacitor (C2) 120A and a capacitor (C2A) 120B as shown in FIG. 2. Capacitor (C2) 120A, for example, can be a linear capacitor, and transistor MC2A can be a MOS device used to form a capacitor-connected FET device (C2A) 120B, which acts as a non-linear capacitor. As depicted, the capacitor-connected transistor MC2A (C2A) 120B has its gate coupled to a voltage input (VNL) and its body coupled to ground (Vss). The voltage on the voltage input signal (VNL) determines the amount of charge that will be subtracted or depleted from integration node 103 (node 2) during the integration cycle. As discussed above, the voltage input (VNL) can be selected to adjust the operational characteristics of the integrating capacitor circuitry. For example, by setting the voltage on the voltage input (VNL) higher than the final integration voltage for the integration node 103, the non-linear effect of the capacitor-connected FET device (C2A) 120B is not realized, and the net integration capacitance (C) 120 is the sum of the C2 and C2A. This technique can be used to lower the sensitivity of the circuit without significantly changing the integration time. If desired, the voltage input (VNL) can be provided as a programmable or user-selectable value so that the operational of the integration capacitance (C) 120 can be adjusted based upon the operational environment or to obtain desired operational characteristics.

Looking back to FIG. 2, as depicted, the summing capacitor (Csum) 124 is implemented as a capacitor-connected FET device (C4) utilizing MOS transistor MC4. As with transistor MC2A, the drain and source of transistor MC4 are coupled together. In particular, the drain and source of transistor MC4 are coupled to a reference voltage (VOREF), and the gate of transistor MC4 forms the opposite plate of the capacitor and is connected to summing node 107. Transistor M5 acts as amplifying transistor 104, has its gate coupled to summing node 107, and has its body coupled to ground (VSS). Transistor M6 acts as transistor 106, is controlled by the PEN signal connected to its gate, and has its body coupled to supply voltage (VDD3A). Transistor M2A 202 has its gate coupled to a reference voltage VREF2 and acts as a resistor in the circuit. Transistor M2 acts as switch (Sr1) 110 and is controlled by the PR signal. Transistor M3 acts as switch (S1) 112, is controlled by the PSI signal connected to its gate, and has its body coupled to a supply voltage (VDD3A). Transistor M4 acts as switch (S2) 114, is controlled by the PS2 signal connected to its gate, and has its body coupled to a supply voltage (VDD3A). Transistor M1 acts as transistor 102 and has its gate coupled to bias voltage VGG[0], which may be a signal that is part of a multi-bit signal (VGG[3-0]) that is utilized to control the voltage drop across detector pixel cells, as discussed above. It is further noted that signal line 201 (node 1) that is coupled to transistor M1 102 would be coupled to detector 108, as depicted in FIG. 1B.

In operation, by placing a capacitor-connected field-effect-transistor (FET) C2A in parallel with an integration capacitor C2 and setting its gate voltage to a fixed DC level (VNL), the current from the detector depletes the charge on the gate of the FET capacitor C2A while integrating on the capacitor C2. In addition, as discussed above, the DC level (VNL) can be adjusted to modify the current depleting characteristics of the MOS-capacitor C2A that is in parallel with the integration capacitor C2. This circuit configuration for a integrating capacitance, such as can be used to detect charge or current from pixel cells in an image detector array, greatly increases integration time without greatly increasing the voltage across the capacitor C2. When the charge is depleted on the FET capacitor C2A, only the capacitor C2 is left in circuit, and the original sensitivity of the circuit is maintained. In addition, this same circuit can also be used to lower the sensitivity of the circuit without significantly changing the integration time by setting the gate voltage (VNL) on the FET capacitor C2A higher than the final voltage on the capacitor C2. Thus, the integrating capacitance circuitry architecture of the present invention provides a flexible, configurable, and efficient solution for integrating capacitors and integrating amplifiers that utilize such circuits. And a wide variety of integrating architectures could be utilized while still taking advantage of the capacitor-connected FET of the present invention. It is further noted that the capacitor values and transistor sizings for the integrating capacitance circuitry and related amplifier circuitry can be selected depending upon the operational characteristics desired.

It is noted that although a circuit application for the present invention is described above with respect to pixel cell amplifiers for image detectors, the present invention is broadly applicable to any circuit that measures current or charge with an integrating capacitor. As discussed above, the present invention advantageously provides a capacitor-connected FET device with its gate connected to a selectable voltage to improve integration time and sensitivity with respect to such integration capacitors. And the non-linear operation of this capacitor-connected FET device helps facilitate these performance advantages.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An integrating amplifier, comprising:
   a detector element coupled to an integration node;
   an integrating capacitance circuit, comprising:
      an integrating capacitor coupled between the integration node and a reference node, the integration node being coupled to receive a current signal from the detector element to be integrated; and
      a first field effect transistor (FET) coupled between the integration node and a voltage node having a voltage level, the first FET having its source and drain coupled to the integration node or the voltage node and having its gate coupled to the other of the integration node or the voltage node to thereby provide a capacitor-connected FET device coupled to the integration node; and
   an amplifier coupled through at least one switch to the integration node to provide an amplified output signal that is related to the current signal from the detector element to be integrated.

2. The integrating amplifier of claim 1, wherein the gate of the first FET is coupled to the voltage node, the voltage level on the voltage node determining an amount of charge that is depleted by the first FET during an integration cycle.

3. The integrating amplifier of claim 2, wherein voltage level for the voltage node is a user-selectable voltage level.

4. The integrating amplifier of claim 1, further comprising a first switch coupled between the integration node and the amplifier to form a summing node and a summing capacitor coupled to the summing node.

5. The integrating amplifier of claim 4, further comprising a second switch coupled between the first switch and the summing node to form a transfer node and a transfer capacitor coupled to the transfer node.

6. The integrating amplifier of claim 5, wherein transfer capacitor and the summing capacitor are also coupled the reference node.

7. The integrating amplifier of claim 6, wherein the summing capacitor is a second FET having its source and drain coupled to the summing node, the second FET thereby providing a capacitance coupled between the summing node and the reference node.

8. The integrating amplifier of claim 7, wherein the wherein the first and second FETs comprise MOS transistors.

9. The integrating amplifier of claim 5, wherein the amplifier comprises a third FET having its gate connected to the summing node and its source providing the amplified output signal.

10. The integrating amplifier of claim 9, wherein the third FET has its drain coupled to a transistor configured to determine whether the third FET is "on" or "off."

11. An integrating capacitance circuit, comprising:
    an integrating capacitor coupled between an integration node and a reference node, the integration node being an integrating node coupled to receive a current signal to be integrated;
    a field effect transistor (FET) coupled between the integration node and a voltage node having a voltage level configured to be a fixed DC voltage level for a charge integration cycle, the FET having its source and drain coupled to the integration node or the voltage node and having its gate coupled to the other of the integration node or the voltage node to thereby provide a capacitor-connected FET device coupled to the integration node; and
    a switch coupled between the reference node and the integration node, the switch being configured to initialize the integration node to a reference voltage level on the reference node.

12. The integrating capacitor circuit of claim 11, wherein the wherein the FET comprises a MOS transistor.

13. The integrating capacitor circuit of claim 11, wherein the gate of the FET is coupled to the voltage node, the voltage level on the voltage node determining an amount of charge that is depleted by the FET during an integration cycle.

14. The integrating capacitor circuit of claim 13, wherein the voltage level is a user-selectable voltage level.

15. The integrating capacitor circuit of claim 11, further comprising a resistor-connected FET coupled between the integration node and the FET.

16. A method for integrating signals, comprising
    applying a current signal to be integrated to an integration node;
    integrating charge on the integration node for a period of time utilizing an integration capacitor;
    depleting charge from the integration node during the integrating step utilizing a field effect transistor (FET) coupled between the integration node and a voltage node having a voltage level, the FET having its source and drain coupled to the integration node or the voltage node and having its gate coupled to the other of the integration node or the voltage node to thereby provide a capacitor-connected FET device coupled to the integration node; and
    transferring charge from the integration node to another node through at least one switch;
    wherein the gate of the FET is coupled to the voltage node, the voltage level determining an amount of charge that is depleted by the FET during the integration step; and
    wherein the voltage level is programmable.

17. A method for integrating signals, comprising
    applying a current signal to be integrated to an integration node;
    integrating charge on the integration node for a period of time utilizing an integration capacitor;
    depleting charge from the integration node during the integrating step utilizing a field effect transistor (FET) coupled between the integration node and a voltage node having a voltage level, the FET having its source and drain coupled to the integration node or the voltage node and having its gate coupled to the other of the integration node or the voltage node to thereby provide a capacitor-connected FET device coupled to the integration node; and transferring charge from the integration node to another node through at least one switch;

wherein the gate of the FET is coupled to the voltage node, the voltage level determining an amount of charge that is depleted by the FET during the integration step; and wherein the voltage level is set higher than a voltage level expected for the integration node such that charge is depleted by the FET throughout the time period for the integration step and the capacitor-connected FET thereby provides additional integrating capacitance throughout the period of time for the integration step.

18. The method of claim 16, wherein the voltage level is set lower than a voltage level expected for the integration node such that charge is depleted by the FET for only a portion of the period of time for the integration step and the capacitor-connected FET thereby provides additional integrating capacitance for only that portion of the period of time for the integration step.

19. The method of claim 16, wherein the current signal to be integrated comprises a current signal from a pixel cell within an image detector array.

20. The method of claim 16, wherein the transferring step comprises transferring charge from the integration node to the another node at regular intervals and storing charge on the another node using a capacitor.

21. A method for integrating signals, comprising applying a current signal to be integrated to an integration node;

integrating charge on the integration node for a period of time utilizing an integration capacitor;

depleting charge from the integration node during the integrating step utilizing a field effect transistor (FET) coupled between the integration node and a voltage node having a voltage level, the FET having its source and drain coupled to the integration node or the voltage node and having its gate coupled to the other of the integration node or the voltage node to thereby provide a capacitor-connected FET device coupled to the integration node; and transferring charge from the integration node to another node through at least one switch;

wherein the transferring step comprises transferring charge from the integration node to the another node at regular intervals and storing charge on the another node using a capacitor; and wherein the another node is a transfer node, and further comprising transferring charge from the transfer node to a summing node at regular intervals, and storing charge on the summing node using a summing capacitor.

22. The method of claim 21, further comprising utilizing an amplifier to provide an output signal dependent upon the charged stored on the summing node.

* * * * *

UNITED STATES PATENT AND TRADEMARK OFFICE
CERTIFICATE OF CORRECTION

| | |
|---|---|
| PATENT NO. | : 7,268,607 B2 |
| APPLICATION NO. | : 11/140846 |
| DATED | : September 11, 2007 |
| INVENTOR(S) | : John F. Brady, III et al. |

It is certified that error appears in the above-identified patent and that said Letters Patent is hereby corrected as shown below:

Column 7, line 54, delete "coupled the" and insert -- coupled to the--:

Column 7, lines 61 – 62, delete "wherein the wherein the" and insert --wherein the--.

Column 8, lines 22-23, delete "wherein the wherein the" and insert --wherein the--.

Signed and Sealed this

Twenty-seventh Day of November, 2007

JON W. DUDAS
*Director of the United States Patent and Trademark Office*